(No Model.)
C. B. BOSWORTH.
INSTRUMENT FOR TESTING AND GRADUATING VACUUM GAGES.
No. 412,830. Patented Oct. 15, 1889.
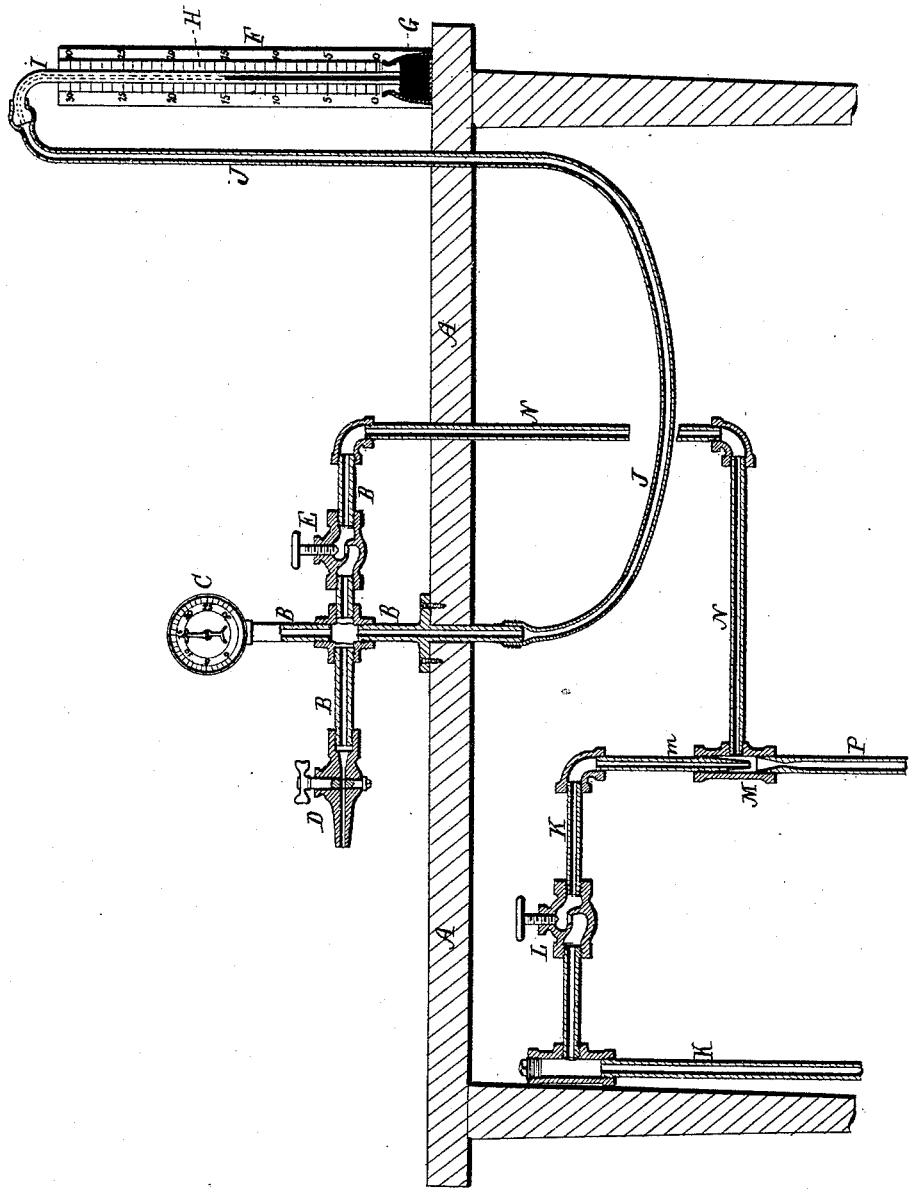
Witnesses
Thos. W. Hobday
W. E. Piper
Inventor
Charles B. Bosworth.
by Singleton & Piper, atty's

UNITED STATES PATENT OFFICE.

CHARLES B. BOSWORTH, OF EVERETT, ASSIGNOR TO THE CROSBY STEAM GAGE AND VALVE COMPANY, OF BOSTON, MASSACHUSETTS.

INSTRUMENT FOR TESTING AND GRADUATING VACUUM-GAGES.

SPECIFICATION forming part of Letters Patent No. 412,830, dated October 15, 1889.

Application filed December 10, 1888. Serial No. 293,077. (No model.)

*To all whom it may concern:*

Be it known that I, CHARLES BARTLETT BOSWORTH, a citizen of the United States, residing at Everett, in the county of Middlesex and State of Massachusetts, have invented certain new and useful Improvements in Instruments for Testing and Graduating Spring Vacuum-Gages; and I do declare the following to be a full, clear, and exact description of the invention, such as will enable others skilled in the art to which it appertains to make and use the same, reference being had to the accompanying drawing, and to the letters and figures of reference marked thereon, which form a part of this specification.

The drawing represents the instrument employed by me for testing and graduating vacuum-gages, it being shown chiefly in section, the gage and barometrical column and some of the small parts being illustrated in elevation.

My invention relates to improved means to be employed in comparing the dials of spring vacuum-gages with a proper standard during the process of marking, by which means greater nicety of graduation is attained than by present methods. This is effected in part by direct reference to a barometrical column from which, conjointly with the vacuum-gage to be graduated, the air may be almost wholly removed by means of an inclosed water-jet, derived from any available source, with which the air intermingles and is ejected with the waste water into the atmosphere. By this means the mercury may be forced so nearly to the top of the barometer-scale as to indicate, when compared with a common barometer, the near approach to a perfect vacuum, affording a standard which covers every practical necessity connected with the graduation of the dials of such vacuum-gages. The scale of the barometrical tube employed is graduated in inches, and while the graduations of the spring-gage dial represent inches they may not conform to inches in measurement depending on the size of the dial employed.

To enable others skilled in the art to make and use my invention, I will proceed to describe its construction and operation, reference being had to the accompanying drawing, forming a part of this specification, and to letters of reference marked thereon.

Upon the top of a bench or stand A A is mounted a cross-pipe B B B B, on the top arm of which is secured the gage to be graduated. The left arm of the cross-pipe is provided with an air-cock D, and the right arm with an air-regulating and shut-off valve E.

On the top of the bench or stand A A is placed a mercurial barometer F, of suitable construction to meet the requirements of this invention. It is provided with a pot of mercury G, and graduated scale H, of suitable length; also, a barometrical tube I, of glass, not sealed at either end, but having its upper end bent to the left to facilitate its connection to other parts. Its lower end rests in the pot of mercury G at the bottom of the instrument. The top of the glass tube I is connected, by means of a rubber tube J J, to the lower arm of the cross-pipe B. The water under pressure for working the instrument, passing through the supply-pipe K K, which is controlled by a suitable valve L, passes, in the form of a jet, through jet-pipe $m$, into the jet-chamber M, with which is directly connected the air-exhausting pipe N N, and indirectly with the rubber tube J J, the air-regulating valve E being open and the air-cock D closed. The waste water from the jet-chamber M passes off by the waste-pipe P.

The operation will be as follows: All the valves being closed, the water-regulating valve L will be opened, permitting the water to pass through the jet-chamber N. A vacuum will immediately be formed within the exhausting-pipe N and as far as the air-regulating valve E, which may now be gradually opened, when the air contained in the cross-pipe B and the rubber tube J will pass off, through the exhausting-pipe N, to the jet-chamber M, from which it will pass with the waste water into the atmosphere. The air is exhausted simultaneously from the barometrical tube and from the spring of the vacuum-gage, so that the quality of the vacuum is at all times the same in each, there being an open communication between them. As the vacuum becomes established in the instrument, the mercury will be seen to rise in the barometrical tube I, while a corresponding movement of the pointer of the spring-gage will take place, which movement may be marked on the dial to represent the number of inches the mercury has risen in the barometrical tube, and so on with the other graduations of the barometer-scale. The mercury in the barometrical tube may be made to stand at any desired figure of its scale by closing the air-regulating valve E, and the air may be permitted to enter all parts of the instrument by opening the air-cock D. The scale of the barometrical column is marked to thirty inches of mercury—about equal to the average pressure of the atmosphere at the sea-level.

I am aware that the results claimed by me as arising from the combination herein set forth may be secured in a less perfect degree by the use of an air-pump, the delicate construction and tedious operation of which, however, is a bar to its practical use, as inapplicable to the general manufacture of vacuum-gages. The general standard now employed is a spring-gage which has been graduated by a mercury column operated by means of an air-pump; but such standard spring-gages cannot be depended on, in view of the liability of the contained transmitting mechanism to become worn and deranged, while the testing of single gages by a mercury column and air-pump is wholly inadmissible, on account of the time required in the operation. With my combination each gage is tested by the mercury column, the accuracy of which is unquestionable, and the rapidity with which gages are tested and graduated far exceeds that attainable when the gages are tested and graduated by the use of an exhausting-pump; besides which vacuum-gages are not generally compared with the standard gage throughout its full scale, but only to about twenty inches of the scale, while the remaining graduations are computed by reference to the graduations below that point. This is to meet the difficulty and tediousness of obtaining anything like a pure vacuum by the use of the air-pump.

Having thus fully described my invention, what I claim, and desire to secure by Letters Patent, is—

1. The combination of the water-jet chamber M and the water-jet pipe $m$, the barometric column F, the piping connecting the chamber and column, the gage attachment secured to the piping, and the valves for controlling the water-jet and the exhaust, as set forth.

2. The combination of the water-jet chamber M, the supply-pipe therefor with its valve and the jet $m$, the barometric column F, the pipes N and J, leading to the chamber and column, the cross-pipe B, and the valve E, all constructed and arranged as described.

In testimony whereof I affix my signature in presence of two witnesses.

CHARLES B. BOSWORTH.

Witnesses:
S. N. PIPER,
ALBERT C. MEADE.